United States Patent
Fritz

[11] Patent Number: 5,955,707
[45] Date of Patent: *Sep. 21, 1999

[54] SOUND DAMPING MEANS FOR AIR CONDITIONING SYSTEM

[75] Inventor: Thomas Fritz, Gernsbach, Germany

[73] Assignee: Trinova GmbH, Baden-Baden, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/711,125

[22] Filed: Sep. 9, 1996

[30]     Foreign Application Priority Data

Sep. 8, 1995  [DE]  Germany ............................ 195 33 270

[51] Int. Cl.$^6$ .................................................... F01N 7/18
[52] U.S. Cl. ........................................... 181/282; 181/255
[58] Field of Search ..................... 181/255, 282, 181/229, 214, 403, 227, 228, 246, 249

[56]               References Cited

U.S. PATENT DOCUMENTS

| | | |
|---|---|---|
| 3,669,471 | 6/1972 | Fetish, Jr. . |
| 3,687,224 | 8/1972 | Lundin .................................... 181/282 |
| 4,880,078 | 11/1989 | Inoue et al. .......................... 181/282 X |
| 4,993,513 | 2/1991 | Inoue et al. ............................. 181/282 |
| 5,174,127 | 12/1992 | Harper et al. ........................... 181/403 |
| 5,340,952 | 8/1994 | Takiguchi ................................ 181/282 |

FOREIGN PATENT DOCUMENTS

| | | |
|---|---|---|
| 637182 | 9/1963 | Belgium . |
| 014257 | 8/1980 | European Pat. Off. . |
| 659600 | 6/1995 | European Pat. Off. . |
| 1893770 | 1/1964 | Germany . |
| 2456399 | 8/1976 | Germany . |
| 7827573 | 9/1978 | Germany . |

*Primary Examiner*—Khanh Dang
*Attorney, Agent, or Firm*—Ostrolenk, Faber, Gerb & Soffen, LLP

[57]               ABSTRACT

To damp the sound in an air conditioning system, particularly a vehicle air conditioning system, a tubular sound damping body is provided having openings at its opposite ends through which a liquid or gaseous medium flows. A respective connection tube is fitted at at least one and preferably at both of the openings, with the tube being of smaller cross-section than the sound damping body and the openings into the sound damping body. An isolating device in the form of an isolating element is around the inserted portion of each connection tube and also engages the interior of the sound damping body. Isolating element receiving recesses may be defined in the inserted end portion of the connection tube and the ends of the sound damping body for receiving the isolating elements. The isolating elements are comprised of an elastic rubber like material. Alternately, a spacer may be disposed around the elastic isolation device and engages the isolation device on the inside and the sound damping body on the outside.

13 Claims, 4 Drawing Sheets

SOUND DAMPING MEANS FOR AIR CONDITIONING SYSTEM

BACKGROUND OF THE INVENTION

The invention relates to sound damping means, in particular for a vehicle air conditioning system, and particularly improves upon known sound damping means of this type which are used particularly in air conditioning systems of motor vehicles. The known means comprise a cylindrical sound damping body which can be introduced into a tubular shape conduit. The two tube ends are usually soldered onto the sound damping body.

Sound waves, particularly caused by pulsation of the refrigerant and by vibration of the compressor, are damped in the sound damping body because it has a larger diameter than the tube conduit. However, this known method of sound damping should be improved because with vehicles becoming increasingly quiet, the noise generated by the air conditioning system can be heard more clearly.

SUMMARY OF THE INVENTION

The object of the present invention is thus to improve the sound damping properties of sound damping means used in air conditioning systems, particularly for vehicles.

To damp the sound in an air conditioning system, particularly a vehicle air conditioning system, a tubular sound damping body is provided having openings, preferably at its opposite ends, through which a liquid or gaseous medium flows. A respective connection tube is fitted at at least one opening and preferably at both of the openings, with the tube being of smaller cross section or diameter than the sound damping body and the respective opening into the sound damping body. An isolating device, e.g., in the form of an isolating element, extends around the inserted portion of each connection tube and also engages the interior of the sound damping body. The isolation devices are comprised of an elastic material like rubber. Alternately, a spacer may be disposed around the elastic isolating device and engaging the isolation device on the inside and the sound damping body on the outside.

Isolating element receiving recesses may be defined in the inserted end portion of the connection tube and the ends of the sound damping body for receiving the isolation devices.

The isolating element, which is preferably an elastic ring comprised of a rubber containing material, e.g., vulcanized rubber, is arranged between the sound damping body and the connection tube. This limits the propagation of vibrations and structure transmitted sound. Furthermore, the elastic isolating device ensures that the sound damping body can expand in both the longitudinal and the radial directions. This contributes to a further increase in the sound damping capacity. Moreover, tolerance related deviations of the connection tube diameter and of the sound damping body diameter can be better balanced as a result.

The inner wall of the sound damping body is preferably provided with a larger diameter recess which runs in the circumferential direction and is located near or at each opening at each end of the sound damping body. It is possible to fit an isolating device, which is also preferably in the form of a ring, into that recess. This secures the ring against slipping in the longitudinal direction.

The outer wall of the end portion of the connection tube which is inserted into the sound damping body may also have a smaller diameter recess for the isolating device. This is advantageous also to prevent the ring from slipping on the connection tube.

Other objects and features of the invention are explained by way of exemplary embodiments with reference to the drawings.

DESCRIPTION OF THE PREFERRED EMBODIMENTS

Figure 1:
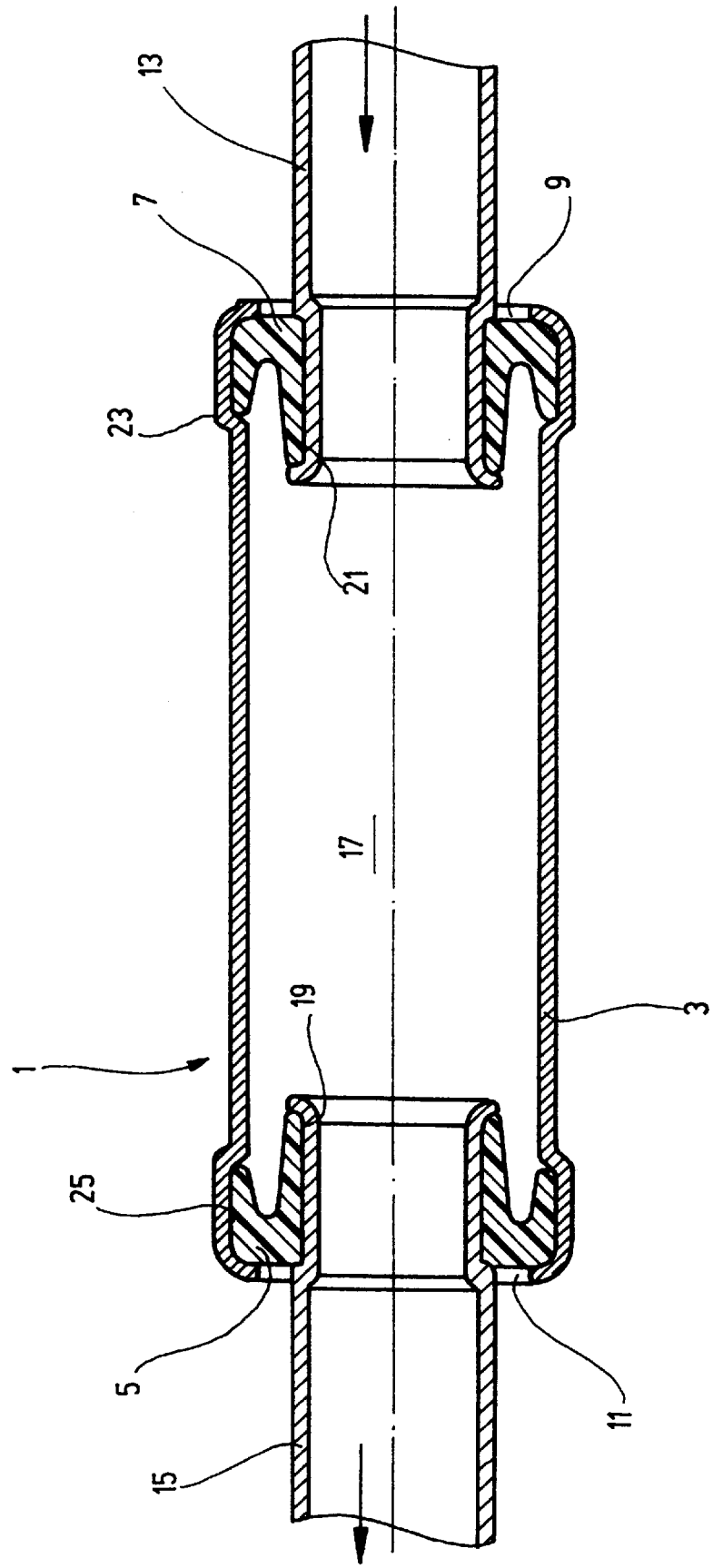
FIG. 1 shows a sectional view of a first embodiment of sound damping means of the invention.

Sound damping means 1 includes a hollow, tubular, cylindrical sound damping body 3 and isolating elements 5 and 7.

The cylindrical sound damping body 3 has openings 9 and 11 at its longitudinal ends, into which respective connection tubes 13 and 15 project. (Possibly, the invention could be applied at only one end of the body 3.)

The interior 17 of the sound damping body 3 is designed such that a liquid or gaseous medium, in particular, a refrigerant (for example R 12 and R 134 A), can flow from one connection tube 13 through to the opposite connection tube 15.

To achieve sound damping, the flow cross section of the sound damping body 3 is larger than the flow cross section of the connection tubes 13 and 15. Further, the openings 9 and 11 are of larger cross-section or diameter than the respective tubes 13 and 15 passing through the openings, or at least those positions of the tubes near to the ends of the body 3, so that the tubes do not directly contact the body 3.

The connection tubes 13, 15 are connected to the sound damping body 3 with the aid of respective isolating devices, which in this embodiment comprise elastic material isolating elements 5 and 7, which have the form of rings. They may be comprised of rubber, vulcanized rubber, a rubber containing or a rubber like material, for example, or other elastic material with sufficient stiffness, resilience and elasticity to seal the tubes 13, 15 in the body 3. Use of rubber containing elastic isolating elements 5, 7 quite effectively suppresses transmission of structure transmitted sound or vibrations from the connection tube 13 to the connection tube 15. Each elastic isolating element has an internal diameter selected to be somewhat smaller than the external diameter of its connection tube and an external diameter somewhat larger than the internal diameter of the sound damping body 3. The elasticity and resilience of the isolating elements and their above mentioned dimensions provide a positively locked connection when the isolating elements are squeezed into the radial spaces between the sound damping body 3 on the outside of the isolating elements and the connection tubes 13 or 15 on the inside of the elements. However, other connecting methods, for example adhesive bonding, are also possible.

Furthermore, the isolating elements additionally seal the interior 17 of the sound damping body 3 towards the outside, preventing refrigerant from escaping.

In FIG. 1, the connection tubes 13 and 15 and the sound damping body 3 have shaped end sections 19, 21, 23 and 25. The respective shaped sections 19 and 21 of the connection tubes 15 and 13 are formed by reductions in the external diameter of the connection tubes in the regions of the tubes inserted in the body 3 beyond the openings 9 and 11. However, the diameter of each tube increases again toward the inserted end of the connection tube at a flange.

The two shaped sections 23 and 25 at the opposite longitudinal ends of the sound damping body 3 are formed, in a complementary manner to the sections 19 and 21 and around those sections, by an increase in the internal diameter of the body 3.

Furthermore, FIG. 1 shows the isolating elements 5 and 7 being located in the shaped sections 19, 25 and 21, 23, respectively. This secures the two isolating elements 5 and 7 against displacement in the longitudinal direction.

In the first embodiment, the isolating elements 5, 7 each have a generally U-shaped cross section, with the two legs of the U extending in the longitudinal direction of the body and the joining portion of the U toward the end of the body 3. In this arrangement, the radial inner leg of the U has a longer length in longitudinal cross section than the outer leg. This shaping increases the damping properties.

Instead of the shaped sections 19, 25 and 21, 23, other types of positive locking connection and securement in the longitudinal direction may be provided, for example, adhesive bonding.

Figure 2:
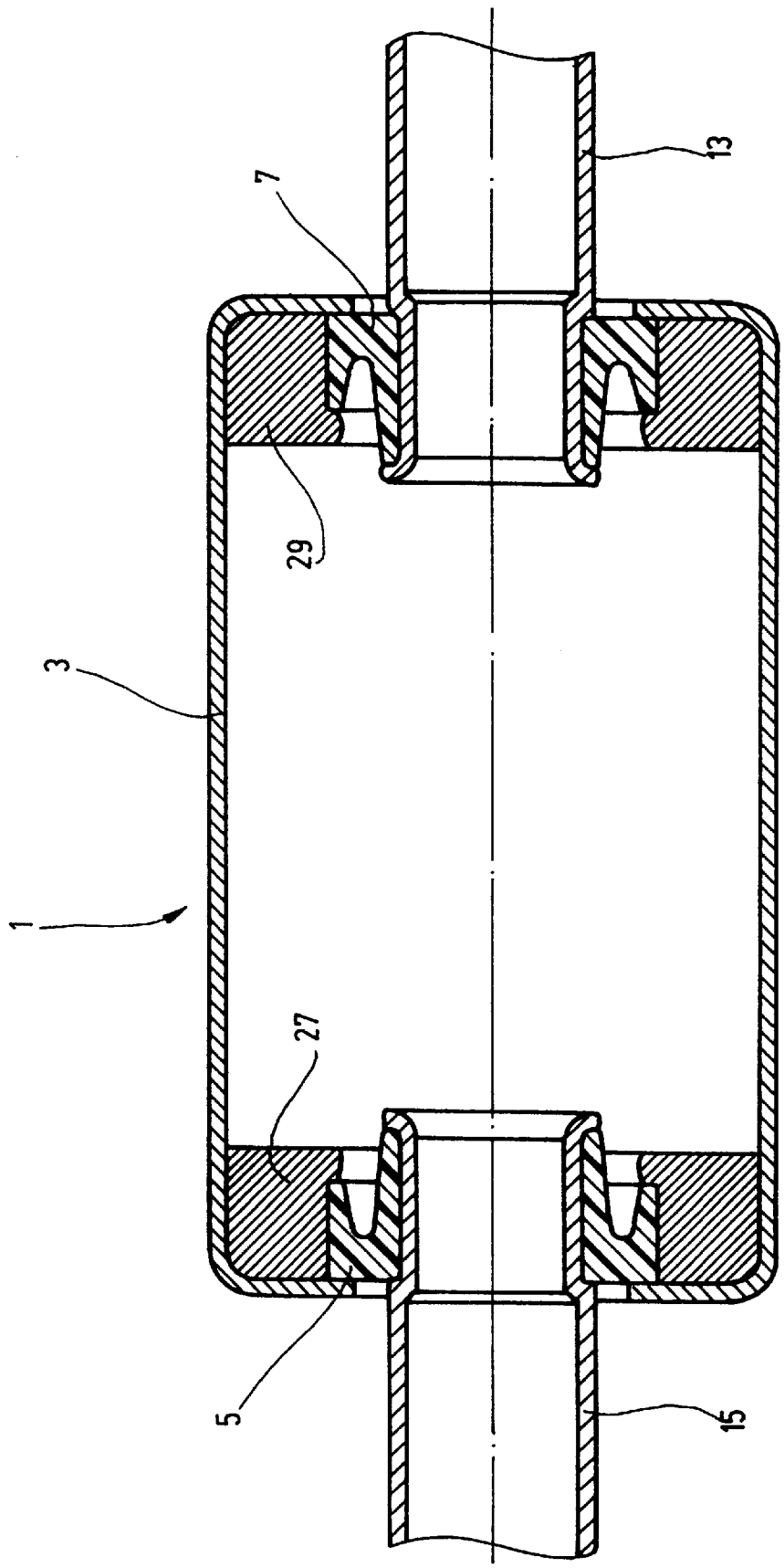
FIG. 2 shows a sectional view of a second embodiment.
Figure 3:
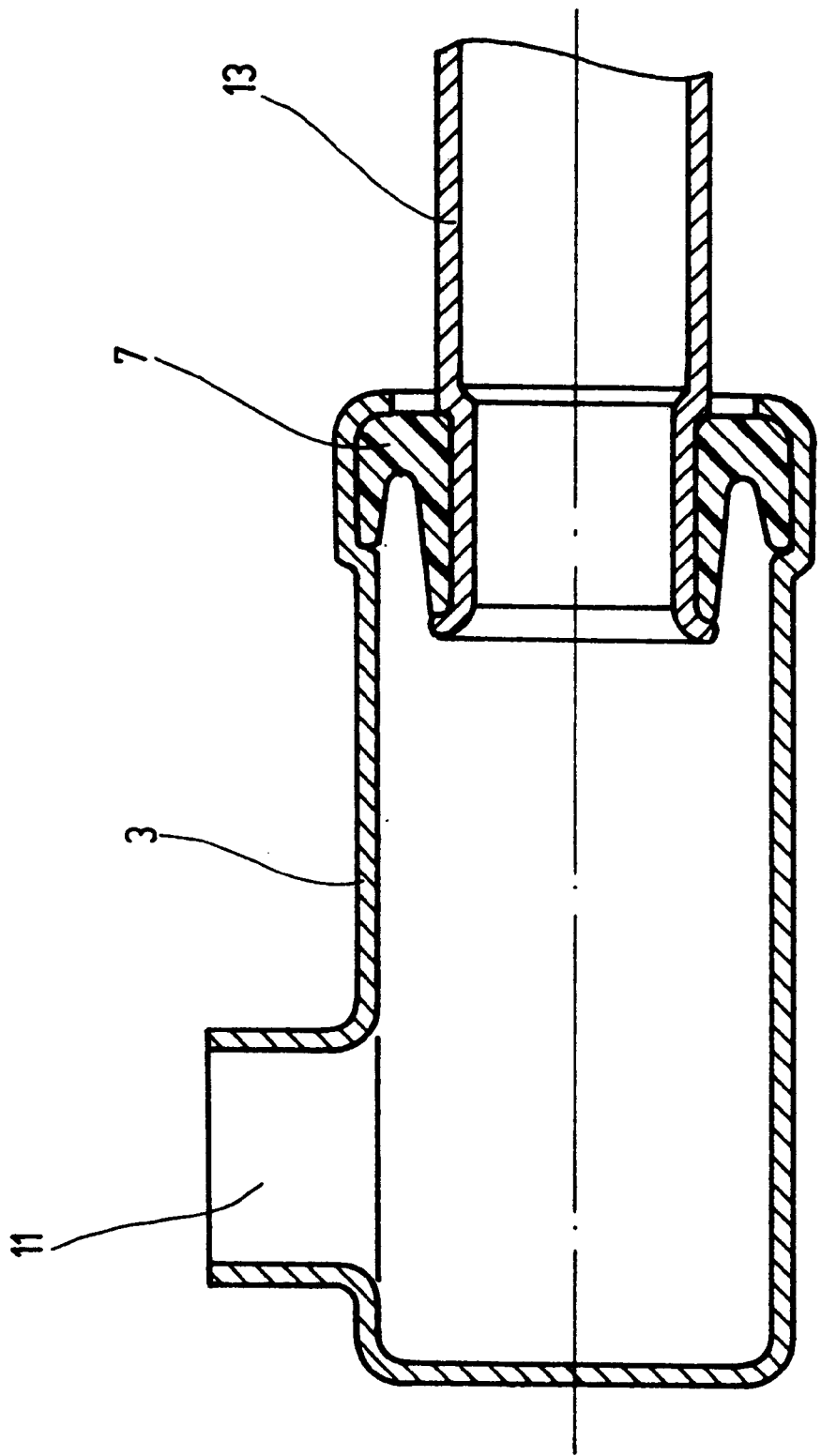
FIG. 3 shows a sectional view of a third embodiment.
Figure 4:
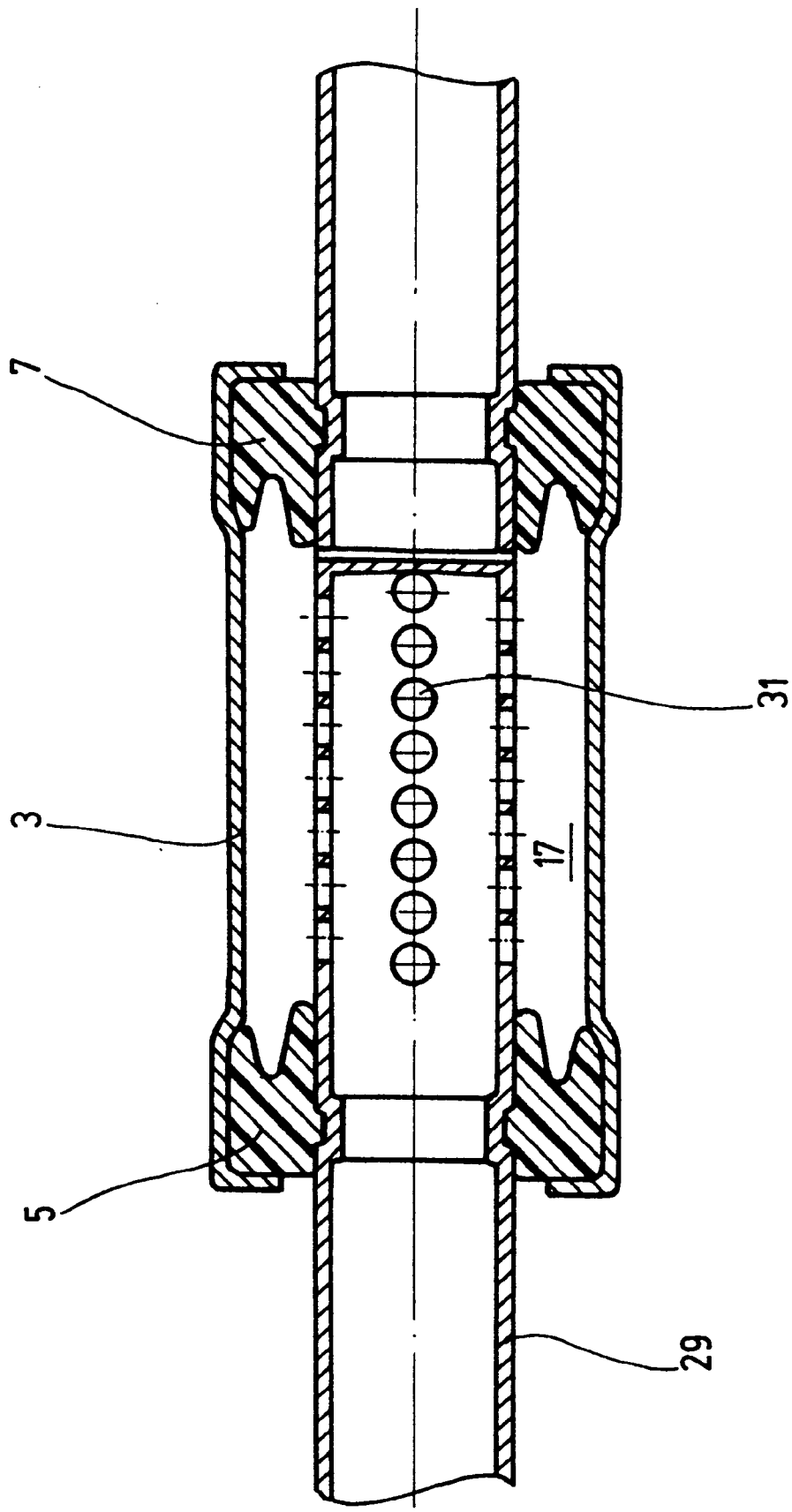
FIG. 4 shows a sectional view of a fourth embodiment.

FIGS. 2 to 4 show further embodiments. The same parts are designated by the same reference numbers, so that these parts are not again described.

The second exemplary embodiment of FIG. 2, differs from the first embodiment essentially in that the isolation devices comprise additional spacer rings 27 and 29 provided between the isolating elements 5 and 7 and the sound damping body, that is, radially outward of and extending around the elements 5 and 7. The spacers permits more freedom regarding the selection of the diameter of the sound damping body 3, without the necessity of supplying different size or types of isolating elements 5 and 7. The geometry of the spacers makes them easier to shape in different sizes than the elements 5 and 7. The spacers 27 and 29 are connected to the isolating elements 5 and 7 and to the sound damping body 3 by a pinch connection. Other methods of positively locking connection are useful, for example adhesive bonding.

The embodiment of FIG. 3 essentially corresponds to the first exemplary embodiment, except that the opening 11 is provided on the lateral surface of the sound damping body 3 rather than at one end.

The fourth embodiment of FIG. 4 differs from the first embodiment in that the sound damping body 3 further encloses a continuous tube 29. Bores 31 provided in the tube 29 ensure a connection between the interior of the tube 29 and the interior 17 of the sound damping body 3. For even better damping of structure transmitted sound and vibrations, the tube 29 in the interior of the sound damping body 3 should be separated to produce two separate connection tubes. That separation can be seen at the right of tube 29 in FIG. 4.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Sound damping means for an air conditioning system, comprising:

a hollow sound damping body including at least two openings through which a liquid or gaseous medium can flow;

a connection tube fitted at at least one of the openings, the tube including an end portion extending into the body past the one opening into the body; the sound damping body having a greater cross-section and the connection tube having a smaller cross-section at least generally at the opening in the sound damping body and where the tube extends into the sound damping body, whereby the sound damping body does not directly contact the connection tube;

an isolating device comprised of elastic material located inside the sound damping body at and inward from the one opening and positioned between and contacting the sound damping body and the connection tube;

the sound damping body having an interior that is shaped for defining a recess and the recess having the form of a larger diameter region in the sound damping body toward the one opening, and the isolating device at the connection tube at the one opening to the sound damping body including a portion thereof extending into the recess in the sound damping body.

2. Sound damping means for an air conditioning system, comprising:

a hollow sound damping body including at least two openings through which a liquid or gaseous medium can flow;

a connection tube fitted at at least one of the openings the tube including an end portion extending into the body past the one opening into the body; the sound damping body has a greater cross-section and the connection tube has a small cross-section at least generally at the opening in the sound damping body and where the tube extends into the sound damping body;

an isolating device comprised of elastic material, located inside the sound damping body at and inward from the one opening and positioned between and contacting the sound damping body and the connection tube;

the isolating device being of generally U-shaped cross section and having a first leg running longitudinally with respect to the sound damping body and a second leg running longitudinally with reference to the connection tube and the isolating device having a joining portion between the first and second legs and directed toward the one end of the sound damping body.

3. Sound damping means for an air conditioning system, comprising:

a hollow sound damping body including at least two openings through which a liquid or gaseous medium can flow;

a connection tube fitted at at least one of the openings, the tube including an end portion extending into the body past the one opening into the body;

the one opening in the sound damping body is of greater cross section than the connection tube at the location at the one opening, so that there is no direct contact between the sound damping body and the connection tube; and an isolating device comprised of elastic material located inside the sound damping body at and inward from the one opening and positioned between and contacting the sound damping body and the connection tube, the sound damping body being connected with the connection tube only by the isolating device.

4. The sound damping means of claim 3, wherein the sound damping body has a greater cross-section and the connection tube has a small cross-section at least generally at the opening in the sound damping body and where the tube extends into the sound damping body.

5. The sound damping means of claim 3, wherein the end region of the connection tube includes a smaller diameter depression shaped for receiving the isolating device.

6. The sound damping means of claim 5, wherein the isolating device comprises an isolating element with a profiled body shaped for contacting the portion of the connection tube extending into the sound damping body, and the profiled body of the isolating element including a portion contacting the sound damping body.

7. The sound damping means of claim 3, wherein the isolating device comprises an isolating element with a profiled body shaped for contacting the portion of the connection tube extending into the sound damping body, and the profiled body of the isolating element including a portion contacting the sound damping body.

8. The sound damping means of claim 7, wherein the isolating element is of generally U-shaped cross section having a first leg running longitudinally with respect to the sound damping body and a second leg running longitudinally with reference to the connection tube, and the isolating element having a joining portion between the first and second legs and directed toward the one end of the sound damping body.

9. The sound damping means of claim 3, wherein the isolating device is comprised of a rubber containing material.

10. The sound damping means of claim 3, wherein the isolating device is comprised of vulcanized rubber.

11. The sound damping means of claim 3, further comprising a respective one of the connection tubes at each of the at least two openings into the sound damping body.

12. The sound damping means of claim 11, further comprising a respective one of the isolating devices between the respective connection tube and the sound damping body at each of the openings in the sound damping body.

13. The sound damping means of claim 4, wherein the end portion of the connection tube includes a smaller diameter depression shaped for receiving the isolating device.

\* \* \* \* \*